United States Patent Office 3,207,787
Patented Sept. 21, 1965

3,207,787
N-ALKOXY-α-SUBSTITUTED CYCLOALKYL-PROPYLAMINES
Joseph Levy, Paramus, N.J., assignor to Universal Oil Products Company, Des Plaines, Ill., a corporation of Delaware
No Drawing. Filed Feb. 21, 1962, Ser. No. 174,674
7 Claims. (Cl. 260—563)

This invention relates to a new class of chemical compounds which have pharmacological properties and particularly to N-alkoxy-α-substituted ethylamines and their nitrogen lower alkyl derivatives as well as the non-toxic salts of such compounds, and to methods by which these new compositions can be produced.

The compounds of the present invention may be represented by the formula

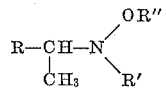

wherein R is a saturated alkyl or a saturated alicyclic group containing from five to seven carbon atoms. $R'_2$ is hydrogen or a lower alkyl group and R″ is a lower alkyl group.

Compounds having the above formula form addition salts with both mineral and organic acids and the non-toxic salts of such compounds are embraced within the scope of the invention.

Accordingly, the principal object of the present invention is to provide a new class of chemical compounds.

A further object of the invention is to provide novel methods by which such compounds may be produced.

These and other objects and the advantages of the present invention will appear from the following description thereof wherein reference is made to typical compounds and methods of manufacture for the purpose of indicating the nature of the invention but without intending to limit the scope of the invention thereby.

In general, the N-alkoxy amines of the present invention and their non-toxic salts have valuable pharmacological properties. These compounds produce responses that simulate those obtained by stimulation of adrenergic nerves. Thus, they exhibit varying degrees of activity as sympathomimetic drugs and are useful for the relaxation of the smooth muscle of the bronchi and intestinal tract. Many of the compounds exhibit relatively low toxicity.

The alkoxyamine compounds of the present invention are relatively weak bases as compared to the corresponding amines wherein hydrogen is present in place of the alkoxy group on the nitrogen atom. Thus, for example, they cannot be titrated readily in aqueous solution. However, they can be titrated with strong acids by the well known techniques for titration of weak bases in non-aqueous media. Despite their relatively weak basicity, the compounds readily form acid addition salts with both mineral and organic acids. Any non-toxic acids may be used such as hydrochloric, sulfuric, phosphoric, tartaric, acetic, citric, maleic, succinic and the like.

The compounds of the present invention contain an asymmetric carbon atom, and, therefore, are obtained as racemic mixture of dextro- and laevorotatory optical isomers which can be separated by crystallization of their salts with optically active acids. The individual isomers, therefore, are to be considered as embraced within the scope of this invention.

The compounds of the invention can readily be produced by way of the corresponding methyl ketones. The methyl ketone can be converted to its oxime by reaction with hydroxylamine and the resulting oxime in turn is reacted with a lower alkyl halide, sulfate, toluene-sulfonate, or the like, in the presence of alkali to produce the lower alkyl ether of the oxime. This latter compound is then reduced, for example, by means of hydrogen and a catalyst, to produce the desired N-alkoxy-α-substituted ethyl amine. Alternately, the oxime ether may be prepared by reacting the methyl ketone with an alkoxy amine or the N-alkoxy-α-substituted ethylamine produced directly by hydrogenating the methyl ketone in the presence of the alkoxyamine.

Such reactions may be represented as follows:

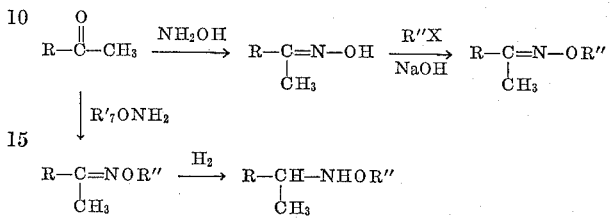

wherein R″X is an alkylating agent as described hereinabove.

If it is desired to produce compounds which are further alkylated on the nitrogen atom, the alkoxyamines may be reacted with formaldehyde and formic acid to produce the N-methyl derivative or with an appropriate lower alkyl halide or other alkylating agent in accordance with well known alkylation procedures.

Typical of the compounds which can be produced are the following:

N-methoxy-4-methyl-2-aminohexane
N-methoxy-5-methyl-2-aminohexane
N-methoxy-2-aminoheptane
N-methoxy-2-amino octane
N-methoxy-2-aminononane
N-methyl-N-methoxy-4-methyl-2-amino hexane
N-ethyl-N-methoxy-4-methyl-2-amino hexane
N-isopropyl-N-methoxy-4-methyl-2-amino hexane
N-butyl-N-methoxy-4-methyl-2-amino hexane
N-methyl-N-ethoxy-4-methyl-2-amino hexane
N-methyl-N-isopropoxy-4-methyl-2-amino hexane
N-ethoxy-4-methyl-2-amino hexane
N-isopropoxy-4-methyl-2-amino hexane
N-butoxy-4-methyl-2-amino hexane
N-methyl-N-methoxy-5-methyl-2-amino hexane
N-methyl-N-methoxy-2-amino heptane
N-ethyl-N-methoxy-2-amino heptane
N-propyl-N-methoxy-2-amino heptane
N-isopropyl-N-methoxy-2-amino heptane
N-butyl-N-methoxy-2-amino heptane
N-ethoxy-2-aminoheptane
N-proproxy-2-amino heptane
N-isopropoxy-2-amino heptane
N-butoxy-2-amino heptane
N-methyl-N-ethoxy-2-amino heptane
N-ethyl-N-ethoxy-2-amino heptane
N-isopropyl-N-ethoxy-2-amino heptane
N-butyl-N-ethoxy-2-amino heptane
N-methyl-N-isopropoxy-2-amino heptane
N-methyl-N-butoxy-2-aminoheptane
N-methoxy-1-cyclopentyl-2-aminopropane
N-ethoxy-1-cyclopentyl-2-aminopropane
N-propoxy-1-cyclopentyl-2-aminopropane
N-isopropoxy-1-cyclopentyl-2-aminopropane
N-butoxy-1-cyclopentyl-2-aminopropane
N-methyl-N-methoxy-1-cyclopentyl-2-aminopropane
N-ethyl-N-methoxy-1-cyclopentyl-2-aminopropane
N-isopropyl-N-methoxy-1-cyclopentyl-2-aminopropane
N-butyl-N-methoxy-1-cyclopentyl-2-aminopropane
N-methyl-N-ethoxy-1-cyclopentyl-2-aminopropane
N-isopropyl-N-ethoxy-1-cyclopentyl-2-aminopropane
N-butyl-N-ethoxy-1-cyclopentyl-2-aminopropane
N-methyl-N-isopropoxyl-1-cyclopentyl-2-aminopropane N-ethyl-N-ethoxy-1-cyclopentyl-2-aminopropane
N-ethyl-N-butoxy-1-cyclopentyl-2-aminopropane
N-methoxy-1-cyclohexyl-2-aminopropane
N-ethoxy-1-cyclohexyl-2-aminopropane
N-propoxy-1-cyclohexyl-2-aminopropane
N-isopropoxy-1-cyclohexyl-2-aminopropane
N-butoxy-1-cyclohexyl-2-aminopropane
N-methyl-N-methoxy-1-cyclohexyl-2-aminopropane
N-ethyl-N-methoxy-1-cyclohexyl-2-aminopropane
N-isopropyl-N-methoxy-1-cyclohexyl-2-aminopropane
N-butyl-N-methoxy-1-cyclohexyl-2-aminopropane
N-methyl-N-ethoxy-1-cyclohexyl-2-aminopropane
N-isopropyl-N-ethoxy-1-cyclohexyl-2-aminopropane
N-butyl-N-ethoxy-1-cyclohexyl-2-aminopropane
N-ethyl-N-ethoxy-1-cyclohexyl-2-aminopropane
N-ethyl-N-butoxy-1-cyclohexyl-2-aminopropane In order to illustrate typical procedure in accordance with the present invention, the following examples are cited:

Example I

A solution of 2-heptanone oxime in aqueous sodium hydroxide was treated with dimethyl sulfate at about 25° C. for about eight hours and the reaction product extracted and distilled to give a mixture of 2-heptanone and the O-methyl ether of the oxime (B.P.=93–9° C./85 mm.). This mixture was then submitted to hydrogenation without further purification as follows:

36 gms. of the above product, containing 81% of the O-methyl ether of 2-heptanone oxime (0.2 mol) was dissolved in 110 gms. of 2 normal ethanolic hydrochloric acid and hydrogenated in the presence of 0.5 gm. platinum oxide catalyst at 25° C. and under an initial hydrogen pressure of 60 p.s.i. The theoretical amount of hydrogen was absorbed in about two and one-half hours, after which the catalyst was filtered and the solvent evaporated in vacuo. The residue was then taken up in water and the mixture extracted with benzene to remove non-basic material. The aqueous solution containing the hydrochloride acid salt of the product was then made alkaline with aqueous sodium hydroxide and the liberated free base extracted with hexane and distilled. There was obtained 21 gms. N-methoxy-2-amino-heptane ($N_d^{20}$=1.4198) distilling at about 50° C. at 3 mm. of pressure. The product analyzed 99% by non-aqueous titration.

Example II

The oxime of cyclopentyl acetone was methylated by treatment with dimethyl sulfate in aqueous sodium hydroxide to give a product containing 58% of the desired O-methyl ether of the oxime (B.P.=78–87° C./10–15 mm.). 54 gms. of this product (0.2 mole of the O-methyl ether) was then hydrogenated in 110 gms. of 2 N ethanolic hydrochloric acid solution in the presence of 0.5 gm. platinum oxide catalyst at 25° C. and under an initial hydrogen pressure of 60 p.s.i. In about three hours theory of hydrogen was taken up, and the catalyst was then filtered and the solvent evaporated in vacuo. The residue was taken up in water and the insoluble oils removed by extraction with hexane. The aqueous solution containing the hydrochloric acid salt of the product was then made alkaline with aqueous sodium hydroxide and the liberated free base extracted with hexane and distilled. There was obtained 24 gms. of N-methoxy-1-cyclopentyl-2-aminopropane ($N_d^{20}$=1.4480) distilling at about 65° C. at 2 mm. of pressure. This material analyzed 98% pure by non-aqueous titration. A crystalline hydrochloride melting at 80.6–81.8° C. and analyzing 100% (by Volhard) was obtained by adding anhydrous hydrogen chloride to an ether solution of the free base.

Example III 42 gms. (0.3 mol) cyclohexyl acetone and 17 gms. methoxyamine hydrochloride (0.2 mol) were dissolved in 100 gms. ethanol plus 8 gms. water and the mixture hydrogenated in the presence of 0.5 gm. platinum oxide catalyst at 25° C. and at an initial hydrogen pressure of 60 p.s.i. The theoretical amount of hydrogen was taken up in three and one-half hours after which the catalyst was filtered and the solvent evaporated in vacuo. The residue was then taken up in 100 gms. water and the mixture extracted with four 50 ml. portions of benzene to remove non-basic material. The aqueous solution was then made alkaline with about 40 ml. 25% aqueous sodium hydroxide and the liberated base extracted with 50 ml. benzene. After removing the solvent the product was distilled to give 22 gms. of N-methoxy-1-cyclohexyl-2-aminopropane $N_d^{20}$=1.4541) distilling at about 88° C. at 5 mm. of pressure. The product analyzed 98% by non-aqueous titration. A crystalline hydrochloride melting at 95.4–96.2° C. and analyzing 100% (by Volhard) was prepared by adding anhydrous hydrogen chloride to an ether solution of the free base.

This product was also prepared by the general procedure of Example I in which the oxime of cyclohexyl acetone was methylated and the O-methyl ether of the oxime then reduced in ethanolic hydrochloric acid in the presence of platinum oxide catalyst.

Example IV 30 gms. of 37% formaldehyde were added to 32 gms. N-methoxy-1-cyclopentyl-2-aminopropane and the mixture warmed to about 80° C. 50 gms. formic acid (90%) was then gradually added during about one-half hour. Reaction took place with evolution of carbon dioxide and the mixture was then maintained at about 90–95° C. for three hours until the evolution of carbon dioxide had practically ceased. It was then cooled and treated with 50% sodium hydroxide until alkaline to litmus and the oil extracted with 100 ml. benzene. The benzene extract was then extracted with two 50 ml. portions of 20% aqueous hydrochloric acid and the aqueous acid solution containing the product was then treated with 20% aqueous sodium nitrite solution. The small amount of yellow nitrosoamine which separated was removed by extraction with benzene and discarded and the aqueous solution then made alkaline with 50% sodium hydroxide to liberate the product as the free base. The oil was then taken up in benzene and distilled. There was obtained 24.8 gms. N-methyl-N-methoxy-1-cyclopentyl-2-aminopropane (B.P.=53–4° C./3 mm. pressure) ($N_d^{20}$=1.4400) analyzing 100% by non-aqueous titration. A crystalline hydrochloride melting at 77.4–79.2° C. and analyzing 99.5% (by Volhard) was prepared by treating an ether solution of the base with anhydrous hydrogen chloride.

Example V 4-methyl-2-hexanone oxime is methylated with dimethyl sulfate in the presence of aqueous sodium hydroxide and the O-methyl ether of the oxime so obtained, is catalytically reduced in ethanolic hydrochloric acid solution in the general procedure of Example I. There is obtained N-methoxy-4-methyl-2-aminohexane.

Example VI

The general procedure of Example V is repeated with the oxime of 2-nonanone. There is obtained N-methoxy-2-aminononane.

From the foregoing examples of compositions and methods embodying the present invention, it will be apparent that various alternative arrangements of the substituents are possible and the methods employed in producing the compounds can be varied considerably to produce the particular compounds desired.

In view thereof, it should be understood that the specific compounds and methods cited are intended to be illustrative only and are not intended to limit the scope of the invention.

I claim:
1. A compound selected from the group consisting of the N-alkoxy-α-substituted ethylamines having the general formula

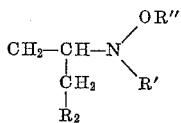

wherein $R_2$ is an alicyclic group containing from five to six carbon atoms; $R'$ is selected from the group consisting of hydrogen and lower alkyl groups containing from one to four carbon atoms and $R''$ is a lower alkyl group containing from one to four carbon atoms; and the non-toxic acid addition salts thereof.

2. N-methoxy-1-cyclopentyl-2-aminopropane.
3. The hydrochloride salt of N-methoxy-1-cyclopentyl-2-aminopropane.
4. N-methoxy-1-cyclohexyl-2-aminopropane.
5. The hydrochloride salt of N-methoxy-1-cyclohexyl-2-aminopropane.
6. N - methyl - N - methoxy - 1 - cyclopentyl - 2-aminopropane.
7. The hydrochloride salt of N-methyl-N-methoxy-1-cyclopentyl-2-aminopropane.

References Cited by the Examiner
UNITED STATES PATENTS
2,649,484   8/53   Hardy _____ 260—564

OTHER REFERENCES
Hecker: Am. Chem. J., vol. 50, pp. 445–466 (1913).
Jones et al.: J.A.C.S., vol. 36, pp. 2202–2208 (1914).
Jones et al.: J.A.C.S., vol. 52, pp. 669–679 (1930).
Neuffer et al.: J.A.C.S., vol. 47, pp. 1685–1687 (1925).

CHARLES B. PARKER, *Primary Examiner.*
LEON ZITVER, *Examiner.*